(12) United States Patent
Sakamoto et al.

(10) Patent No.: US 6,729,987 B2
(45) Date of Patent: May 4, 2004

(54) APPARATUS FOR CONTROLLING VEHICLE AUTOMATIC TRANSMISSION

(75) Inventors: Naoyuki Sakamoto, Toyota (JP); Kazuyuki Watanabe, Anjo (JP); Toshimitsu Sato, Toyota (JP); Atsushi Ayabe, Toyota (JP); Hiromichi Kimura, Okazaki (JP); Hideaki Ogasawara, Anjo (JP); Noboru Shibata, Anjo (JP); Mitsuhiro Nakamura, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/206,039

(22) Filed: Jul. 29, 2002

(65) Prior Publication Data

US 2003/0040388 A1 Feb. 27, 2003

(30) Foreign Application Priority Data

Jul. 31, 2001 (JP) ........................................ 2001-232035

(51) Int. Cl.[7] ............................................... F16H 31/00
(52) U.S. Cl. ........................ 475/117; 475/127; 475/128
(58) Field of Search ................................. 475/117, 127, 475/128

(56) References Cited

U.S. PATENT DOCUMENTS

| | | | | |
|---|---|---|---|---|
| 5,199,326 A | * | 4/1993 | Iwatsuki et al. | 477/98 |
| 5,319,998 A | * | 6/1994 | Iwatsuki et al. | 477/149 |
| 5,833,565 A | * | 11/1998 | Yasue et al. | 475/156 |
| 5,865,702 A | * | 2/1999 | Yokoyama et al. | 475/117 |
| 5,888,170 A | * | 3/1999 | Takiguchi et al. | 477/146 |
| 6,073,071 A | * | 6/2000 | Yasue et al. | 701/51 |
| 6,503,165 B1 | * | 1/2003 | Kubo et al. | 475/125 |

FOREIGN PATENT DOCUMENTS

| | | |
|---|---|---|
| JP | 2-42251 | 2/1990 |
| JP | 2-292567 | 4/1990 |
| JP | 2-218827 | 8/1990 |
| JP | 4-136438 | 5/1992 |
| JP | 7-91530 | 4/1995 |
| JP | 2000-9221 | 1/2000 |

* cited by examiner

*Primary Examiner*—Charles A Marmor
*Assistant Examiner*—David D. Le
(74) *Attorney, Agent, or Firm*—Oblon, Spivak, McClelland, Maier & Neustadt, P.C.

(57) ABSTRACT

Apparatus for controlling a vehicle automatic transmission having a hydraulically operated frictional coupling device operable to effect a shifting action of the automatic transmission, a switching valve operable according to a shifting command to effect the shifting action, and a pressure regulating valve operable to control a pressure of a working fluid to be supplied to the frictional coupling device through the switching valve to effect the shifting action, the apparatus including (a) a fluid temperature detector operable to detect a temperature of the working fluid, and (b) a delaying device operable to delay a moment of initiation of an operation of the pressure regulating valve to control the pressure of the working fluid to be supplied to the frictional coupling device for effecting the shifting action, such that the moment of initiation is delayed depending upon the detected working fluid temperature, to reduce a shifting shock of the automatic transmission.

7 Claims, 10 Drawing Sheets

| POSITION | CLUTCHES AND BRAKES ||||||| O.W.C. ||
| --- | --- | --- | --- | --- | --- | --- | --- | --- | --- |
| | C1 | C0 | C2 | B1 | B2 | C3 | B3 | F1 | F2 |
| N,P | × | × | × | × | × | × | ○ | × | × |
| R | × | × | ○ | × | ○ | × | ○ | × | × |
| D 1st | ○ | × | × | × | × | × | ○ | ○ | △ |
| D 2nd | ○ | ○ | × | ○ | × | × | ○ | × | △ |
| D 3rd | ○ | ○ | × | × | × | × | ○ | × | △ |
| D 4th | × | ○ | × | ○ | × | × | ○ | × | △ |
| D 5th | × | ○ | × | ○ | × | ○ | × | × | × |
| 1st-SPEED ENGIN BRAKE | ○ | × | × | × | ○ | × | ○ | △ | △ |

| OIL TEMPERATURE $T_{OIL}$ (°C) | $<-30$ | $\geq-30$ $<-15$ | $\geq-15$ $<0$ | $\geq 0$ $<20$ | $\geq 20$ $<40$ | ... | $\geq 120$ |
|---|---|---|---|---|---|---|---|
| DELAY TIME (msec) | 1400 | 1200 | 400 | 50 | 50 | | 50 |

APPARATUS FOR CONTROLLING VEHICLE AUTOMATIC TRANSMISSION

This application is based on Japanese Patent Application Nos. 2001-232035 filed on Jul. 31, 2001, the contents of which are incorporated hereinto by reference.

BACKGROUND OF THE INVENTION

1. Field of the Invention

The present invention relates in general to an apparatus for controlling a shifting action of an automatic transmission for an automotive vehicle, and more particularly to techniques for operating a hydraulically operated frictional coupling device at a relatively low temperature of a working fluid, in a manner similar to that at a normal temperature of the working fluid.

2. Discussion of Related Art

For an automotive vehicle, there is known an automatic transmission of a type arranged to be shifted by a shifting action of a hydraulically operated frictional coupling device such that the pressure of a pressurized working fluid to be supplied to the frictional coupling device is regulated by a pressure regulating valve under the control of an electronic control device of a shift control apparatus. The shift control apparatus is arranged such that the pressurized fluid whose pressure is regulated by the electronic control device according to a predetermined control program is directly supplied to the hydraulically operated frictional coupling device after the automatic transmission is commanded to effect a shifting action. This arrangement permits a comparatively high degree of control accuracy of the engaging action of the frictional coupling device. JP-A-2000-9221 discloses an example of such a shift control apparatus for a vehicle automatic transmission, wherein the frequency of a drive signal to be applied to a solenoid-operated valve such as a linear solenoid valve provided to apply a hydraulic signal for controlling the pressure regulating valve is increased when the temperature of the working fluid is lowered, so that the engaging action of the frictional coupling device is controlled with a relatively high response even when the temperature of the working fluid is relatively low.

A known shift control apparatus for an automatic transmission is arranged such that the hydraulic signal for controlling the pressure regulating valve, which hydraulic signal is controlled by the electronic control device, is applied from the solenoid-operated valve to the pressure regulating valve through a switching valve which is operated in response to a command to shift the automatic transmission. Alternatively, the known shift control apparatus is arranged such that the pressurized fluid whose pressure is regulated by the pressure regulating valve is supplied to the hydraulically operated frictional coupling device through such a switching valve. Usually, the switching valve is a shift valve which is switched to effect a selected shifting action of the automatic transmission, according to a hydraulic signal generated from the solenoid-operated valve.

In the known shift control apparatus, the switching action of the switching valve tends to be delayed due to an increase in the viscosity of the working fluid with a decrease in the temperature of the working fluid. Where the pressure of the pressurized fluid to be supplied to the frictional coupling device is regulated according to the predetermined control program immediately after the moment at which the automatic transmission is commanded to be shifted, a delay in the switching action of the switching valve causes a delayed application of the controlled fluid pressure to the frictional coupling device, and an accordingly delayed shifting action of the frictional coupling device. Accordingly, the delay in the switching action of the switching valve causes deterioration of control accuracy of the shifting action of the frictional coupling device due to a low control response of the fluid pressure applied thereto, resulting in a considerable shifting shock of the automatic transmission.

SUMMARY OF THE INVENTION

The present invention was made in the light of the background art discussed above. It is therefore an object of the present invention to provide an apparatus for controlling a vehicle automatic transmission, which apparatus permits accurate control of an engaging action of a hydraulically operated frictional coupling device and is capable of effectively reducing a shifting shock of the transmission, irrespective of a varying temperature of the working fluid used for operating the frictional coupling device.

The object indicated above may be achieved according to the principle of this invention, which provides an apparatus for controlling a vehicle automatic transmission having a hydraulically operated frictional coupling device operable to effect a shifting action of the automatic transmission, a switching valve operable according to a shifting command to effect the shifting action, and a pressure regulating valve operable to control a pressure of a working fluid to be supplied to the frictional coupling device through the switching valve to effect the shifting action, the apparatus comprising: (a) a fluid temperature detector operable to detect a temperature of the working fluid; and (b) delaying means for delaying a moment of initiation of an operation of the pressure regulating valve to control the pressure of the working fluid to be supplied to the frictional coupling device for effecting the shifting action, such that the above-indicated moment of initiation is delayed depending upon the temperature of the working fluid detected by the fluid temperature detector.

In the transmission shift control apparatus of the present embodiment constructed as described above, the delaying means is arranged to delay the moment of initiation of an operation of the pressure regulating valve to control the pressure of the working fluid for effecting the shifting action, such that the moment of initiation of the operation of the pressure regulating valve is delayed on the basis of the temperature of the working fluid as detected by the fluid temperature detector, so that the operation of the pressure regulating valve to control the fluid pressure to be applied to the frictional coupling device is initiated when the switching valve has been completely switched to a position corresponding to the operating position of the automatic transmission to be established by the shifting action. Accordingly, the control of the fluid pressure in the frictional coupling device is initiated at an appropriate point of time determined depending upon the temperature of the working fluid, making it possible to effectively reduce a shifting shock of the automatic transmission, irrespective of a variation in the temperature of the working fluid, that is, irrespective of a variation in the viscosity of the working fluid.

According to one preferred form of the present invention, the apparatus further comprises delay time determining means for determining a delay time by which the moment of initiation of the operation of the pressure regulating valve to control the pressure of the working fluid is delayed, such that the delay time is increased with a decrease in the temperature of the working fluid detected by the fluid temperature detector. In this case, the delaying means delays the moment of initiation of the operation of the pressure regulating valve, by the delay time which is determined by the delay time determining means, so as to be increased as the detected working fluid temperature is lowered, so that the operation of the pressure regulating valve to control the fluid pressure in the frictional coupling device to effect the shifting action of the automatic transmission is initiated when the switching valve has been switched to the position corresponding to the position of the automatic transmission to be established by the shifting action. Thus, the delay time determining means permits accurate control of the releasing or engaging action of the frictional coupling device to effect the shifting action, making it possible to effectively reduce the shifting shock of the automatic transmission, irrespective of a variation in the temperature of the working fluid.

In one advantageous arrangement of the above-indicated preferred form of this invention, the shifting action of the automatic transmission is effected by a releasing action of a first frictional coupling device and an engaging action of a second frictional coupling device, which releasing and engaging actions take place substantially concurrently with each other, and the delaying means delays the moment of initiation of the operation of the pressure regulating valve to control the pressure of the working fluid to be supplied to the first frictional coupling device to effect its releasing action for effecting the shifting action of the automatic transmission. In this case, the delay time is a length of time from a moment of generation of the shifting command to the moment of initiation of the operation of the pressure regulating valve to initiate the releasing action of the first frictional coupling device. Accordingly, the accuracy of control of the releasing action of the first frictional coupling device is improved. Further, the engaging action of the second frictional coupling device is effected in timed relation with the releasing action of the first frictional coupling device, so that those releasing and engaging actions of the two frictional coupling devices can be controlled with a high degree of accuracy, making it possible to further effectively reduce the shifting shock of the automatic transmission, irrespective of the varying temperature of the working fluid.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
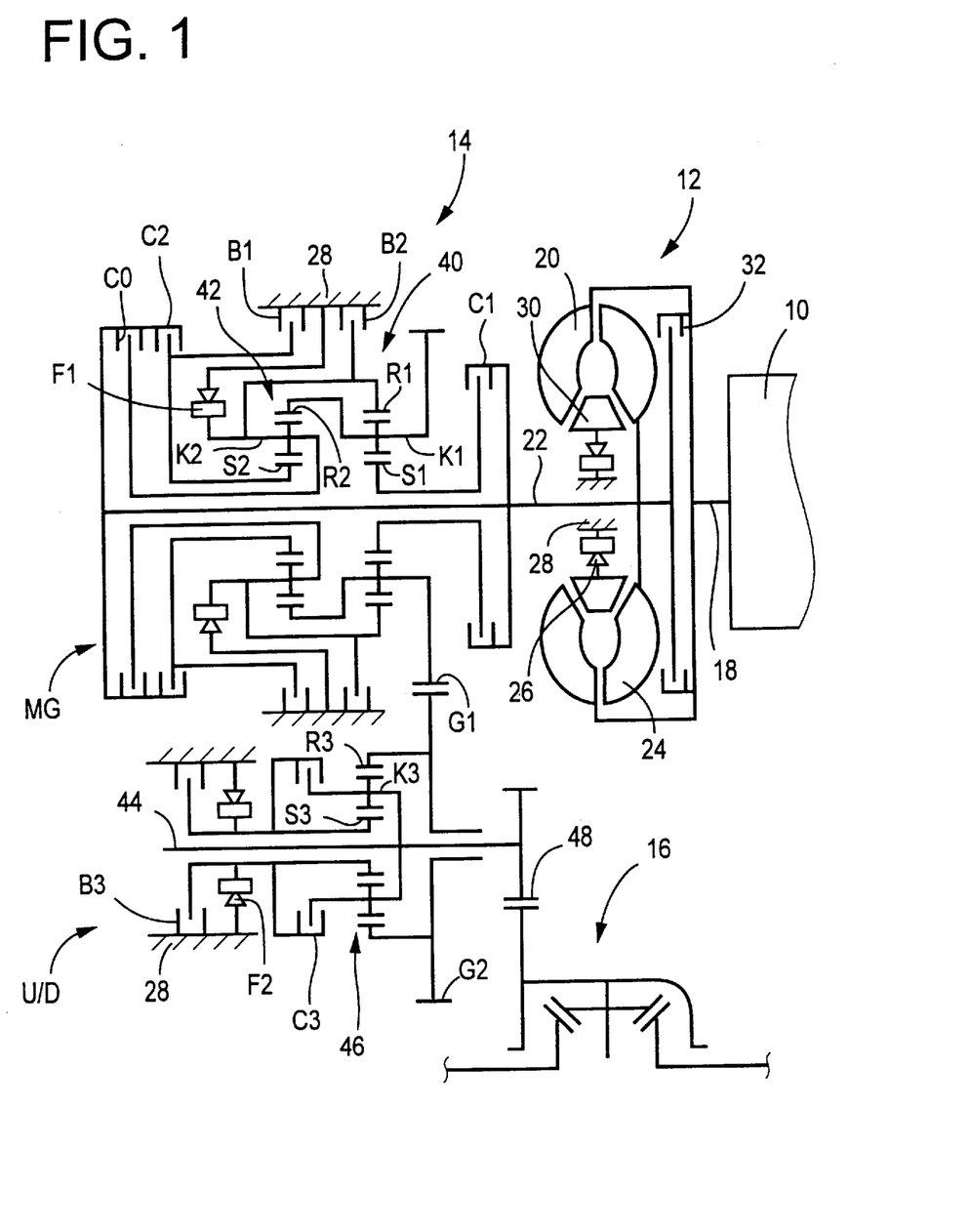
FIG. 1 is a schematic view showing an arrangement of a vehicle drive system to which an automatic transmission control apparatus according to the present invention is applicable.

Referring first to the schematic view of FIG. 1, there is shown an arrangement of a vehicle drive system of an FF (front-engine front-drive) vehicle. The vehicle drive system includes a drive power source in the form of an engine 10, a fluid-operated power transmitting device in the form of a torque converter 12, an automatic transmission 14, and a differential gear device 16. An output of the engine 10 is transmitted to front drive wheels (not shown) of the vehicle through the torque converter 12, automatic transmission 14 and differential gear device 16. The torque converter 12 includes a pump impeller 20 connected to a crankshaft 18 of the engine 10, a turbine impeller 24 connected to an input shaft 22 of the automatic transmission 14, a stator 30 fixed through a one-way clutch 26 to a stationary member in the form of a housing 28, and a lock-up clutch 32 connected to the input shaft 22 through a damper (not shown).

The automatic transmission 14 includes a planetary gear mechanism of so-called "CR—CR connection" type consisting of a first single-pinion planetary gear set 40 and a second single-pinion planetary gear set 42 which are disposed coaxially with each other on the input shaft 22 and which are constructed such that ring gears R1, R2 of the first and second planetary gear sets 40, 42 are connected to respective carriers K2, K1 of the second and first planetary gear sets 42, 40. The automatic transmission 14 further includes a third planetary gear set 46 disposed on a counter shaft 44 parallel to the input shaft 22, and an output gear 48 which is fixed to one end of the counter shaft 44 and which meshes with the differential gear device 16. Each of the first, second and third planetary gear sets 40, 42, 46 has rotary elements in the form of a sun gear S, a ring gear R, a planetary gear meshing with the sun gear and the ring gear, and a carrier K rotatably supporting the planetary gear. Selected ones of the sun gears, ring gears and carriers of the three planetary gear sets 40, 42, 46 are connected to each other through selected ones of four clutches C0, C1, C2 and C3, and are fixed to the housing 28 (stationary member)

through selected ones of three brakes B1, B2 and B3. Further, selected ones of the rotary elements are connected to each other or fixed to the housing 28, through two one-way clutches F1 and F2, depending upon the direction of rotation of the rotary elements. Since the differential gear device 16 is symmetrical with respect to its axis (front axles), only an upper half of the differential gear device 16 is shown in FIG. 1.

The first and second planetary gear sets 40, 42 disposed on the input shaft 22, the clutches C0, C1 and C2, the brakes B1 and B2, and the one-way clutch F1 cooperate to constitute a main shifting portion MG which is operable to establish four forward drive positions and one rear drive position. On the other hand, the third planetary gear set 46 disposed on the counter shaft 44, the clutch C3, the brake B3 and the one-way clutch F2 cooperate to constitute an auxiliary shifting portion or under drive portion U/D. In the main shifting portion MG, the input shaft 22 is connected to the carrier K2 of the second planetary gear set 42, the sun gear S1 of the first planetary gear set 40, and the sun gear S2 of the second planetary gear set 42, through the clutches C0, C1 and C2, respectively. The ring gear R1 of the first planetary gear set 40 is connected to the carrier K2 of the second planetary gear set 42, while the ring gear R2 of the second planetary gear set 42 is connected to the carrier K1 of the first planetary gear set 40. The sun gear S2 of the second planetary gear set 42 is fixed to the stationary member in the form of the housing 28 through the brake B1, while the ring gear R1 of the first planetary gear set 40 is fixed to the housing 28 through the brake B2. The one-way clutch F1 is disposed between the carrier K2 of the second planetary gear set 42 and the housing 28. A first counter gear G1 fixed to the carrier K1 of the first planetary gear set 40 meshes with a second counter gear G2 fixed to the ring gear R3 of the third planetary gear set 46. In the under drive portion U/D, the carrier K3 and sun gear S3 of the third planetary gear set 46 are connected to each other through the clutch C3, and the brake B3 and the one-way clutch F2 are disposed in parallel with each other between the sun gear S3 and the housing 28.

Figure 2:
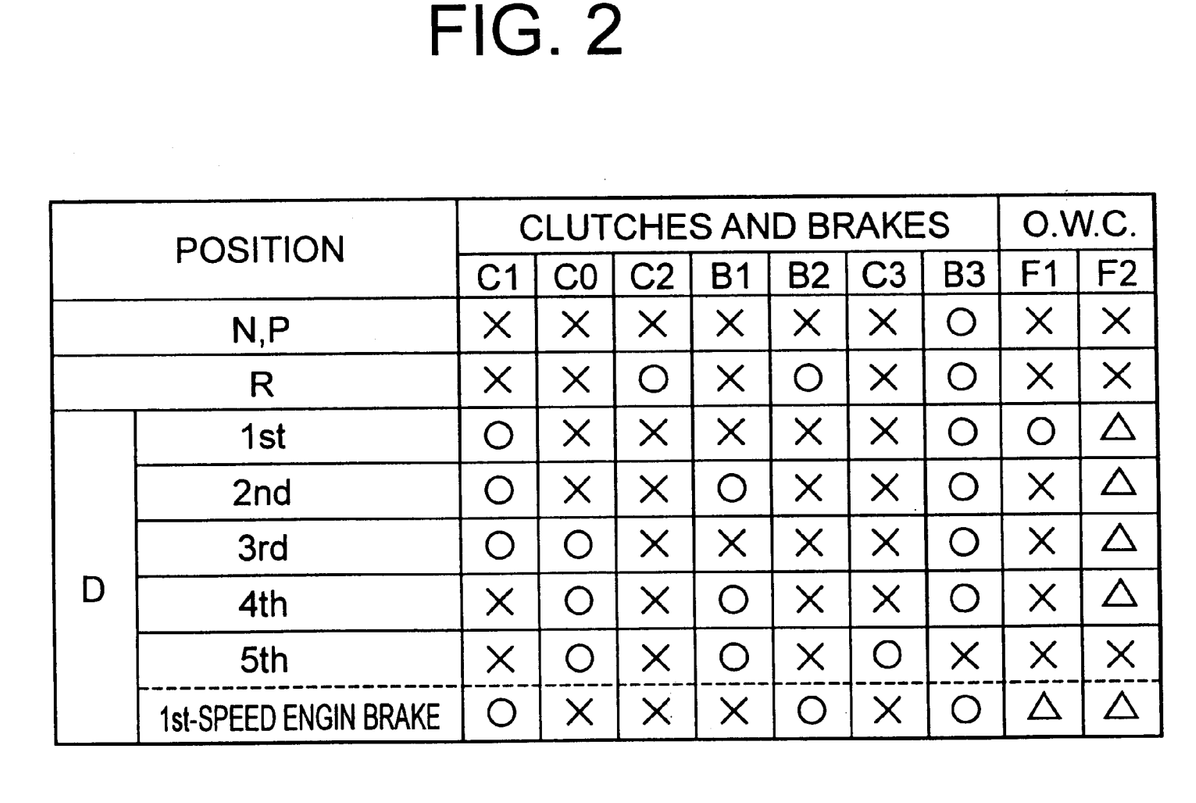
FIG. 2 is a view indicating a relationship between combinations of operating states of frictional coupling devices in the form of clutches and brakes of the automatic transmission of FIG. 1, and operating positions of the automatic transmission which are established by the respective combinations.

Each of the clutches C0, C1, C2, C3 and the brakes B1, B2, B3 (hereinafter referred to collectively as "clutches C" and "brakes B" where appropriate) is a hydraulically operated frictional coupling device such as a multiple-disc clutch or band brake, which is operated by a hydraulic actuator. The clutches C and brakes B are selectively engaged and released to selectively establish the five forward drive positions and one rear drive position, as indicated in FIG. 2, by way of example, by switching actions in a hydraulic control circuit 84 (shown in FIG. 3). The five forward drive positions of the automatic transmission 14 consist of a $1^{st}$-speed position, a $2^{nd}$-speed position, a $3^{rd}$-speed position, a $4^{th}$-speed position and a $5^{th}$-speed position. In FIG. 2, "o" and "x" represent an engaged state and a released state of the clutches C, brakes B and one-way clutches F, respectively, and "Δ" represents an engaged state of the one-way clutches F when a drive force is transmitted to the front drive wheels. For instance, the automatic transmission 14 is shifted up from the $4^{th}$-speed position to the $5^{th}$-speed position by engaging the clutch C3, and shifted down from the $5^{th}$-speed position to the $4^{th}$-speed position by releasing the clutch C3. Further, the automatic transmission 14 is shifted up from the $1^{st}$-speed position to the $2^{nd}$-speed position by engaging the brake B1, and shifted down from the $2^{nd}$-speed position to the first-speed position by releasing the brake B1. However, a shift-up action of the automatic transmission from the $2^{nd}$-speed position to the $3^{rd}$-speed position is achieved by engaging the clutch C0 while concurrently releasing brake B1, and a shift-down action from the $3^{rd}$-speed position to the $2^{nd}$-speed position is achieved by releasing the clutch C0 while concurrently engaging the brake B1. Similarly, a shift-up action from the $3^{rd}$-speed position to the $4^{th}$-speed position is achieved by releasing the clutch C1 while concurrently engaging the brake B1, and a shift-down action from the $4^{th}$-speed position to the $3^{rd}$-speed position is achieved by engaging the clutch C1 while concurrently releasing the brake B1. Thus, those shift-up and shift-down actions are achieved by concurrent engaging and releasing actions of respective two frictional coupling devices.

Figure 3:
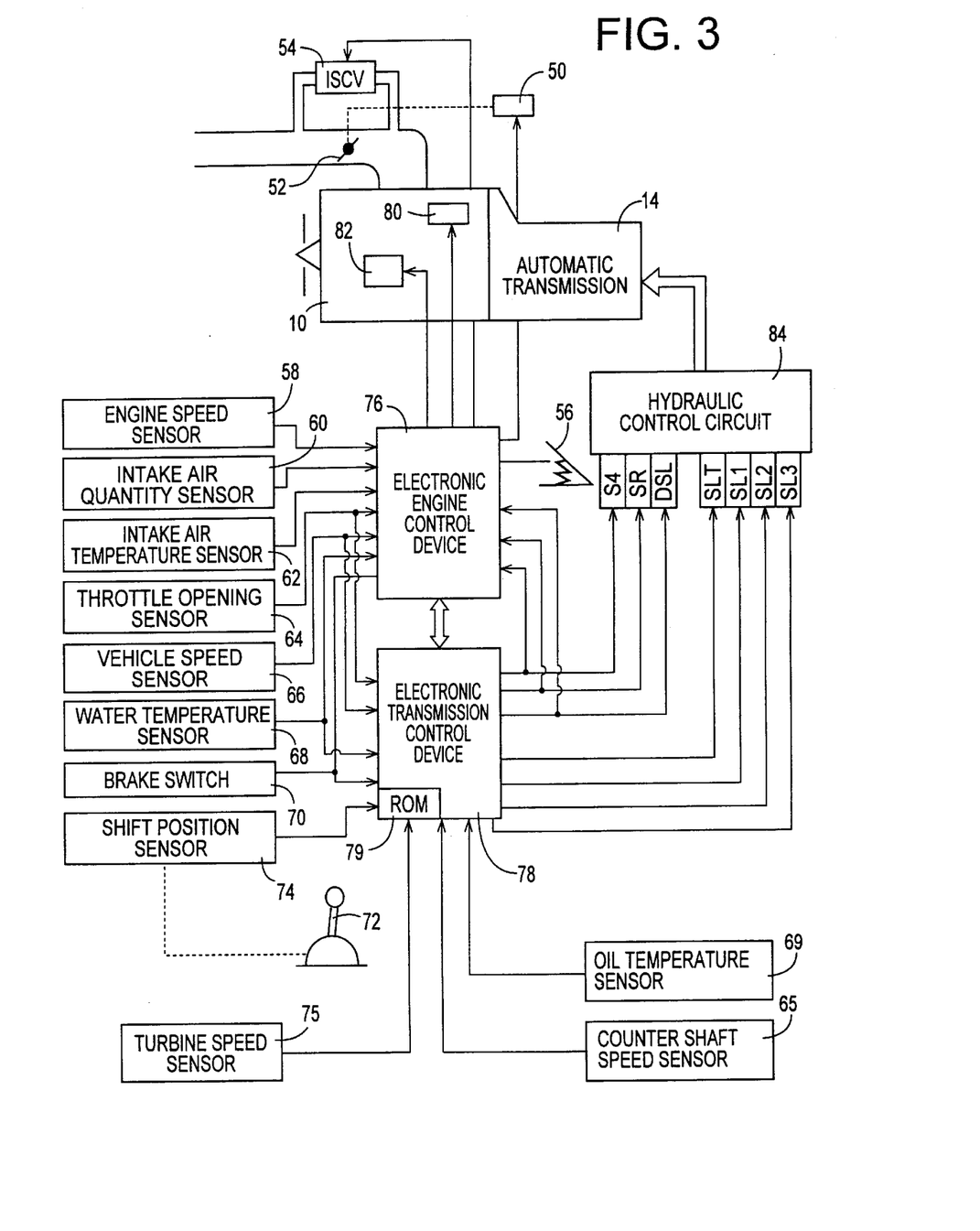
FIG. 3 is a block diagram showing a control system incorporating the automatic transmission control apparatus according to one embodiment of this invention in the form of an electronic transmission control device for controlling the automatic transmission of FIG. 1.

Referring to the block diagram of FIG. 3, there is shown a control system incorporating an automatic transmission control apparatus constructed according to one embodiment of this invention in the form of an electronic transmission control device 78 for controlling the automatic transmission 14 of the vehicle drive system shown in FIG. 1. The control system includes an electronic engine control device 76 for controlling the engine 10, as well as the electronic transmission control device 78. A throttle valve 52 is disposed in an intake pipe of the engine 10. The throttle valve 52 is operated by a throttle actuator 50, which is controlled by the electronic engine control 76 such that an opening angle $\theta_{TH}$ of the throttle valve 52 corresponds to an operating amount $A_{cc}$ of an accelerator pedal 56. A by-pass passage is connected to the intake pipe, so as to by-pass the throttle valve 52, and is provided with an ISC valve (idling speed control valve) 54, which functions to control an intake air quantity introduced into the engine 10 when the throttle valve 52 is placed in its idling position. Namely, the ISC valve 54 is capable of controlling an idling speed $NE_{IDL}$ of the engine 10. The ISC valve 54 is controlled by the electronic engine control device 76. The electronic engine control device 76 and the electronic transmission control device 78 receive output signals of various sensors and switches, which output signals include a signal representative of the operating amount $A_{CC}$ of the accelerator pedal 56. The sensors and switches include: an engine speed sensor 58 for detecting an operating speed NE of the engine 10; an intake air quantity sensor 60 for detecting an intake air quantity Q introduced into the engine 10; an intake air temperature sensor 62 for detecting a temperature $T_A$ of the intake air; a throttle opening sensor 64 for detecting the opening angle $\theta_{TH}$ of the throttle valve 52; a counter shaft speed sensor 65 for detecting a rotating speed $N_C$ of the second counter gear G2; a vehicle speed sensor 66 for detecting a running speed V of the vehicle; a water temperature sensor 68 for detecting a temperature $T_W$ of a cooling water of the engine 10; an oil temperature sensor 69 for detecting a temperature $T_{OIL}$ of a working fluid in the automatic transmission 14; a brake switch 70 for detecting an operating state BK of a braking system (not shown); a shift position sensor 74 for detecting a presently selected position $P_{SH}$ of a shift lever 72; and a turbine speed sensor 75 for detecting a rotating speed NT of the turbine impeller 24, which is equal to a rotating speed $N_{IN}$ of the input shaft 22.

Figure 4:
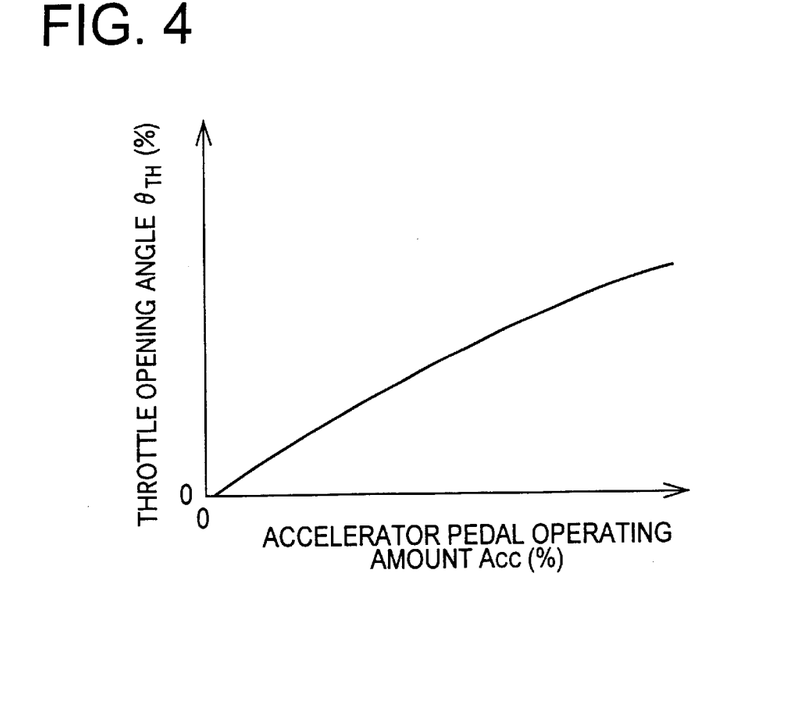
FIG. 4 is a graph indicating an example of a predetermined relationship between an operating amount of an accelerator pedal and an opening angle of a throttle valve, which relationship is used by the electronic transmission control device of FIG. 3 to control the throttle valve.

The electronic engine control device 76 is constituted principally by a microcomputer incorporating a central processing unit (CPU), a random-access memory (RAM), a read-only memory (ROM), and an input-output interface. The CPU of the control device 76 operates to process input signals according to programs stored in the ROM, while utilizing a temporary data storage function of the RAM, for effecting various controls of the engine 10, such as a fuel injection control of controlling a fuel injector valve 80 to control an amount of a fuel to be injected into the engine 10, an ignition timing control of controlling an igniter 82 to control the ignition timing of the engine 10, and a throttle opening control of controlling the throttle valve 52 to control its opening angle $\theta_{TH}$ on the basis of the operating amount $A_{CC}$ of the accelerator pedal 56 and according to a predetermined relationship between the opening angle $\theta_{TH}$ and the operating amount $A_{CC}$, as indicated in the graph of FIG. 4 by way of example. This predetermined relationship is represented by a data map or equation stored in the ROM. The CPU of the electronic engine control device 76 is further adapted to effect an idling speed control of controlling the ISC valve 54 to control the idling speed $N_{IDL}$ of the engine 10.

Figure 5:
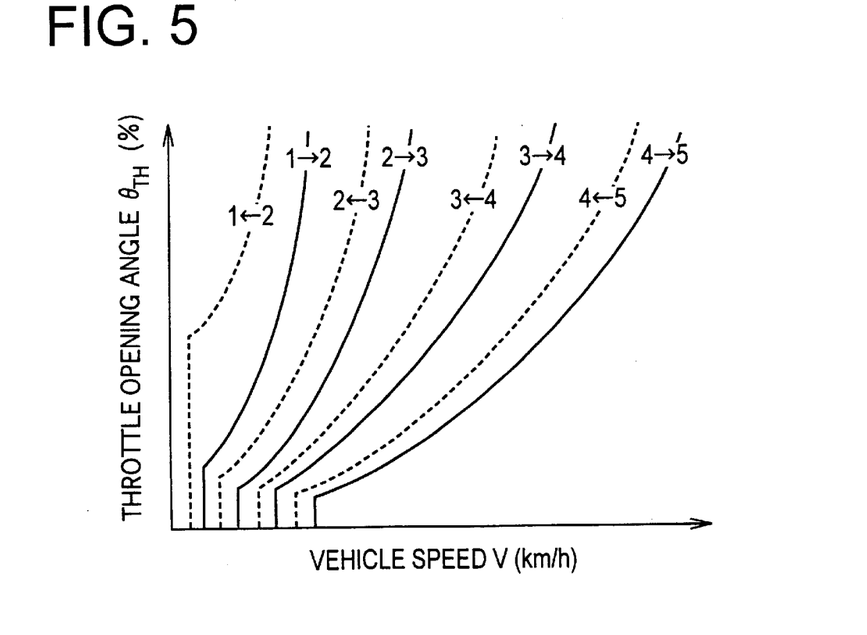
FIG. 5 is a graph showing an example of shift-up and shift-down boundary lines which are used by the electronic transmission control device of FIG. 3, to control shifting actions of the automatic transmission.

Like the electronic engine control device 76, the electronic transmission control device 78 is constituted principally by a microcomputer whose CPU operates to process input signals according to programs stored in the ROM, while utilizing a temporary data storage function of the RAM, for controlling solenoid-operated values and linear solenoid vales of the hydraulic control circuit 84. For instance, the control device 78 controls shifting up and down the automatic transmission 14 on the basis of the detected opening angle $\theta_{TH}$ of the throttle valve 52 and the detected vehicle running speed V, and according to predetermined shift-up and shift-down boundary lines represented by data maps stored in the ROM 79 of the control device 78. In the graph of FIG. 5, the shift-up boundary lines are indicated by solid line, while the shift-down boundary lines are indicated by broken lines. These boundary lines represent relationships between the throttle opening angle $\theta_{TH}$ and vehicle speed V. Described in detail, the forward drive position to which the automatic transmission 14 must be shifted up or down is determined on the basis of the detected opening angle $\theta_{TH}$ and vehicle speed V, and according to the predetermined shift-up and shift-down boundary lines. The automatic transmission 14 is shifted up or down depending upon whether a point defined by the detected opening angle $\theta_{TH}$ and vehicle speed V has moved across any one of the shift-up and shift-down boundary lines in a shift-up or shift-down direction. The above-indicated point represents the specific running condition of the vehicle. The electronic transmission control device 78 also controls the operating state of the lock-up clutch 24. The automatic transmission 14 is shifted to the determined operating position, by suitably controlling the solenoid-operated valves S4, SR and DSL and linear solenoid valves SLT, SL1, SL2 and SL3.

Figure 6:
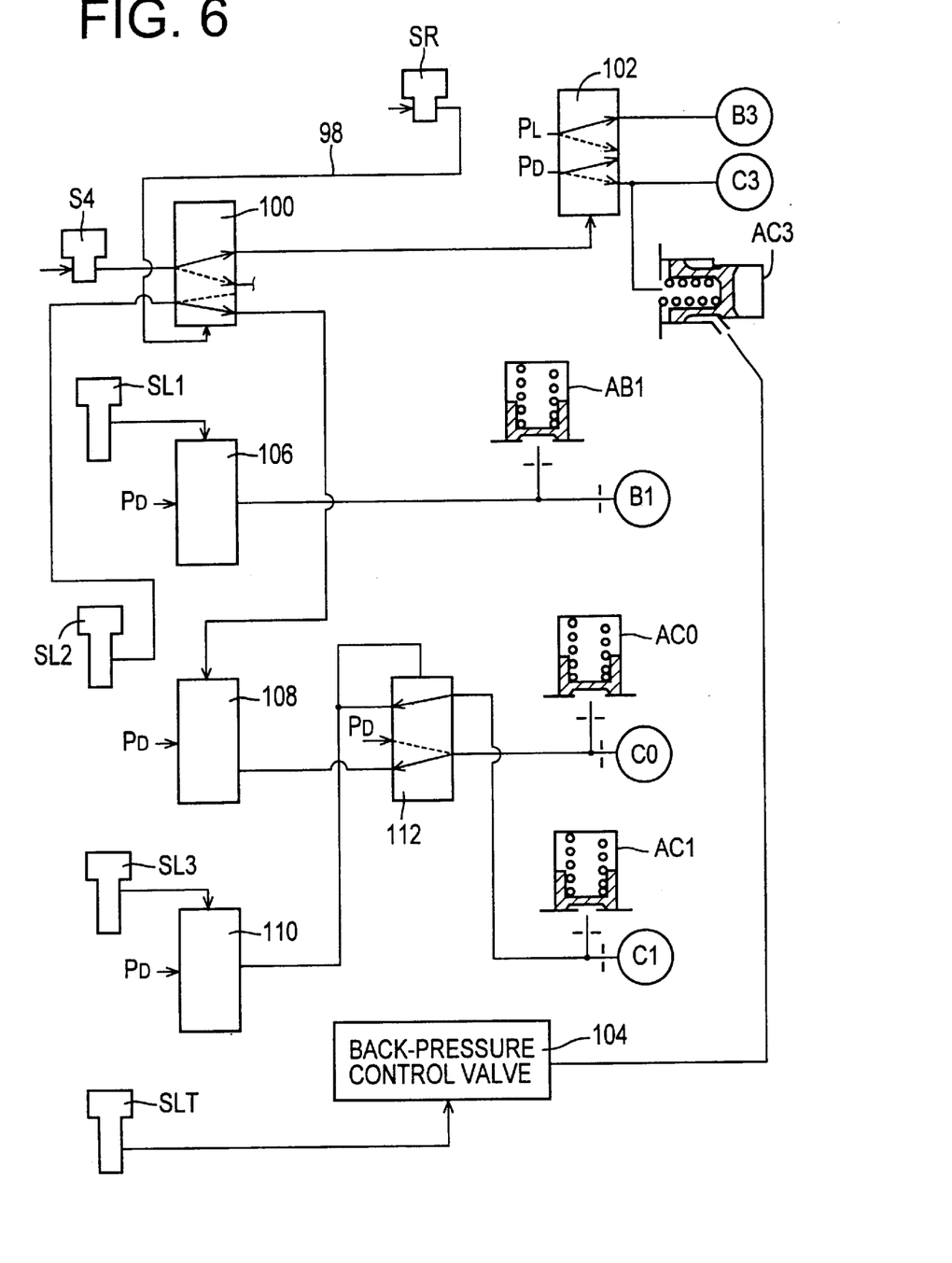
FIG. 6 is a hydraulic circuit diagram schematically showing an arrangement of a hydraulic control circuit shown in FIG. 3.

Referring next to FIG. 6, there is schematically shown major elements of the hydraulic control circuit 84. In the hydraulic control circuit 84, the solenoid-operated valve SR is connected to a 2–3 shift valve 100 through a comparatively long fluid passage 98. An output pressure of the solenoid-operated valve SR is applied to the 2–3 shift valve 100, under the control of the electronic transmission control device 78, to selectively place the 2–3 shift valve 100 in one of a $1^{st}$-$2^{nd}$ speed position and a $3^{rd}$-$5^{th}$ speed position. The solenoid-operated valve S4 is connected to the 2–3 shift valve 100. An output pressure of this valve S4 is applied to a 4–5 shift valve 102 through the 2–3 shift valve 100 placed in its $3^{rd}$-$5^{th}$ speed position, under the control of the control device 78, to selectively place the 4–5 shift valve 102 in a $1^{st}$-$4^{th}$ speed position and a $5^{th}$ speed position. That is, a line pressure $P_L$ (a forward-drive pressure $P_D$) is applied to the brake B3 when the 4–5 shift valve 102 is placed in the $1^{st}$-$4^{th}$ speed position, and is applied to the clutch C3 and an accumulator AC3 for the clutch C3, when the 4–5 shift valve 102 is placed in the $5^{th}$ speed position. The linear solenoid valve SLT is connected to a back-pressure control valve 104.

An output pressure of the linear solenoid valve SLT is applied to the back-pressure control valve 104 under the control of the electronic transmission control device 78, to generate back pressure corresponding to the output pressure, so that the back pressure is applied to a back-pressure port of the accumulator AC3 for the clutch C3.

The linear solenoid valve SL1 is connected to a B1 control valve 106. An output pressure of this linear solenoid valve SL1 is applied to the B1 control valve 106 under the control of the transmission control valve 78, to generate and regulate an engaging pressure P.sub.B1 corresponding to the output pressure, so that the engaging pressure $PP_{B1}$ is applied to the brake B1 and an accumulator AB1 for the brake B1. The linear solenoid valve SL2 is also connected to the 2–3 shift valve 100. An output pressure of this linear solenoid valve SL2 is applied to a C0 control valve 108 through the 2–3 shift valve 100 under the control of the transmission control device 78, to generate and regulate an engaging pressure $P_{C0}$ corresponding to the output pressure, so that the engaging pressure $P_{C0}$ is applied to the clutch C0 and an accumulator AC0 for the clutch C0. The 2–3 shift valve 100 is switched by the solenoid-operated valve SR. The linear solenoid valve SL3 is connected to a C1 control valve 110. An output pressure of this linear solenoid valve SL3 is applied to the C1 control valve 110 under the control of the transmission control device 78, to generate and regulate an engaging pressure $P_{C01}$ corresponding to the output pressure, so that the engaging pressure $P_{C1}$ is applied to the clutch C1 and an accumulator AC1 for the clutch C1. The engaging pressure $P_{C0}$, $P_{C1}$ are applied to the clutches C0, C1, respectively, through a clutch-pressure control valve 112 whose operating position is determined by the engaging pressure $P_{C01}$.

Figure 7:
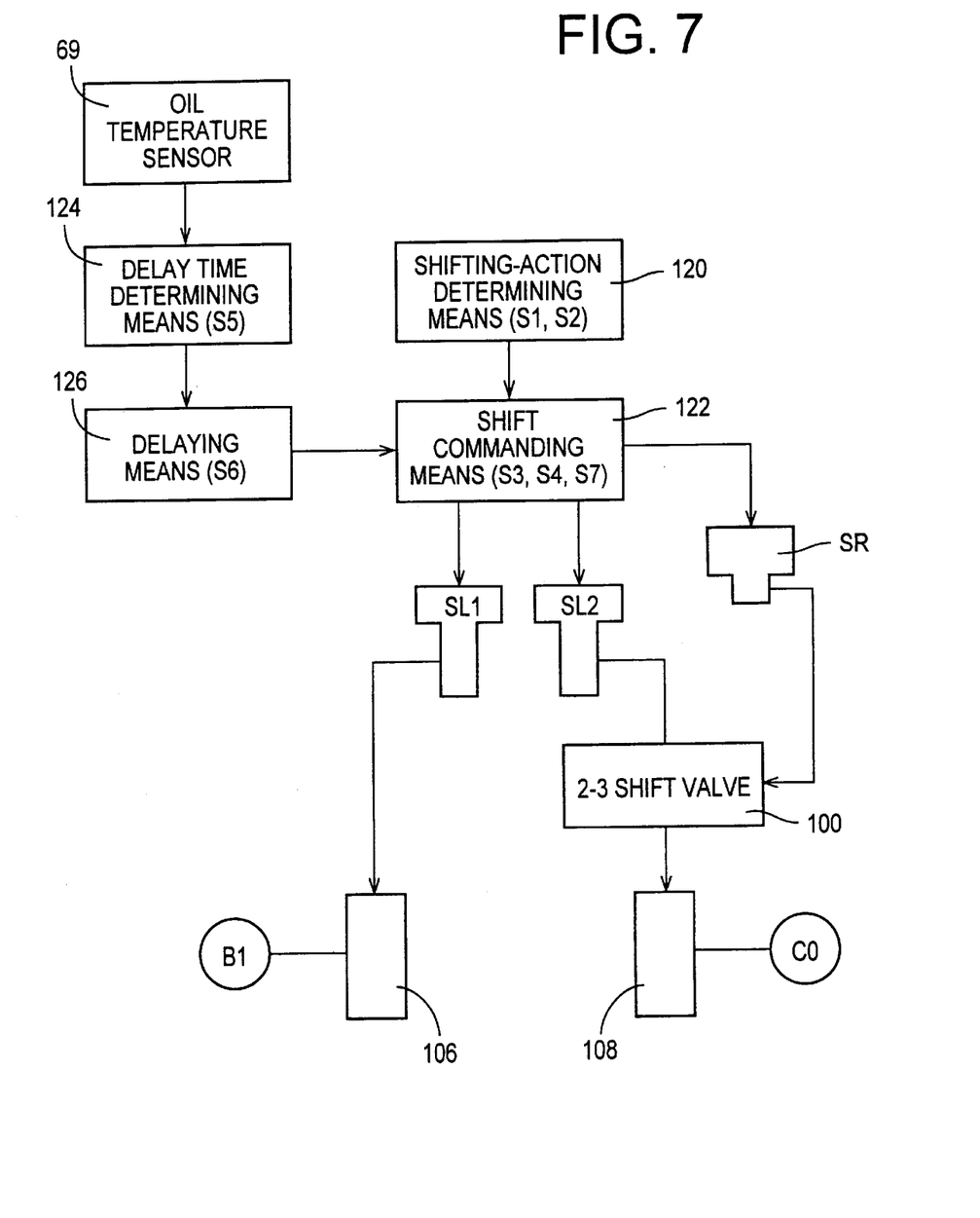
FIG. 7 is a block diagram illustrating major functional means of the electronic transmission control device of FIG. 3.
Figure 10:
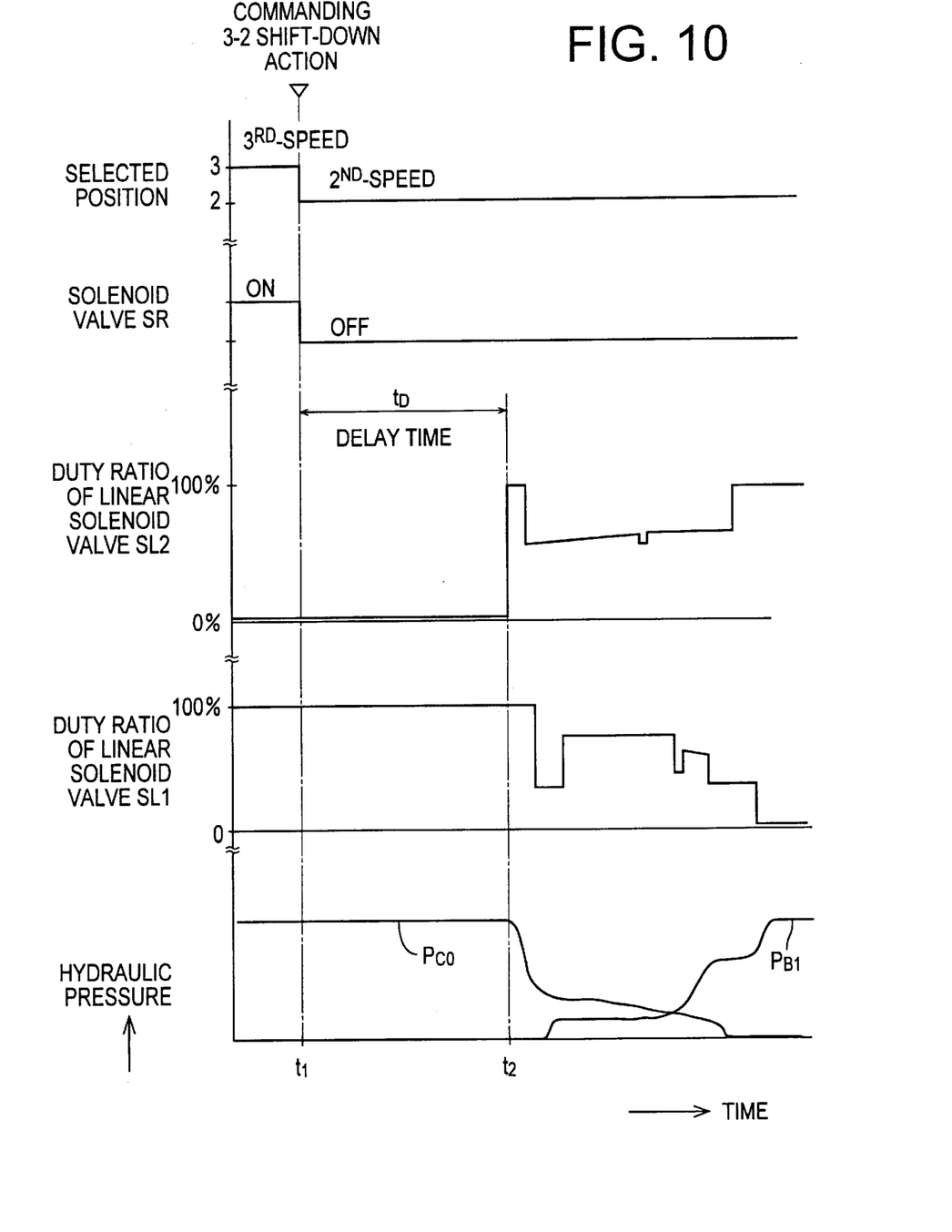
FIG. 10 is a time chart indicating changes of various parameters when the automatic transmission is shifted down under the control of the electronic transmission control device of FIG. 3.

Referring next to the block diagram of FIG. 7, there are illustrated major functional means of the electronic transmission control device 78, which constitutes a portion of an automatic transmission control apparatus according to this embodiment of the present invention. The transmission control device 78 includes shifting-action determining means 120, shift commanding means 122, delay time determining means 124 and delaying means 126. The shifting-action determining means 120 is arranged to determine a requirement for a shifting action of the automatic transmission 14, on the basis of the detected vehicle speed V and opening angle $\theta_{TH}$ of the throttle valve 52, and according to the shift-up and shift-down boundary lines of FIG. 5 represented by the data map stored in the ROM 79, as described above in detail. When the shifting-action determining means 120 determines that the automatic transmission 14 should be shifted up or down, the shifting-action determining means 120 commands the shift commanding means 122 to apply drive signals to the appropriate linear solenoid valves so that the determined shifting action is effected. For example, where the point defined by the detected vehicle speed V and throttle opening angle $\theta_{TH}$ has moved across the 3–2 shift-down boundary line indicated by broken line in FIG. 5, as a result of a decrease of the vehicle speed V, for instance, the shifting-action determining means 120 determines that the automatic transmission 14 should be shifted down from the $3^{rd}$-speed position to the $2^{nd}$-speed position. In this case, the shifting-action determining means 120 commands the shift commanding means 122 to apply the drive signals to the linear solenoid valves SL1 and SL2 for controlling the engaging pressure PB1 of the brake B1 and the engaging pressure $P_{C0}$ of the clutch C0 so that the brake B1 is engaged while the clutch C0 is released. The drive signals operate the linear solenoid valves SL1 and SL2 at controlled duty ratios as indicated in the time chart of FIG. 10. Since these linear solenoid valves SL1, SL2 are normally open valves, the engaging pressure PB1 of the brake B1 and the engaging pressure $P_{C0}$ of the clutch C0 are zero when the solenoid coils are energized at the duty ratio of 100%. To effect the 3–2 shift-down action by engaging the brake B1 while concurrently releasing the clutch C0, the engaging pressures PB1 and PC0 are slowly increased and reduced, respectively, as shown in FIG. 10, with high accuracy according to a predetermined program or a predetermined feedback control equation, with the releasing action of the clutch C0 initiated prior to the initiation of the engaging action of the brake B1, so as to prevent a tie-up behavior of the brake B1 and clutch C0 and a racing of the input shaft 22 (an abrupt rise of the speed of the input shaft 22), throughout the entire periods of the engaging and releasing actions of the brake B1 and clutch C0.

Figure 8:
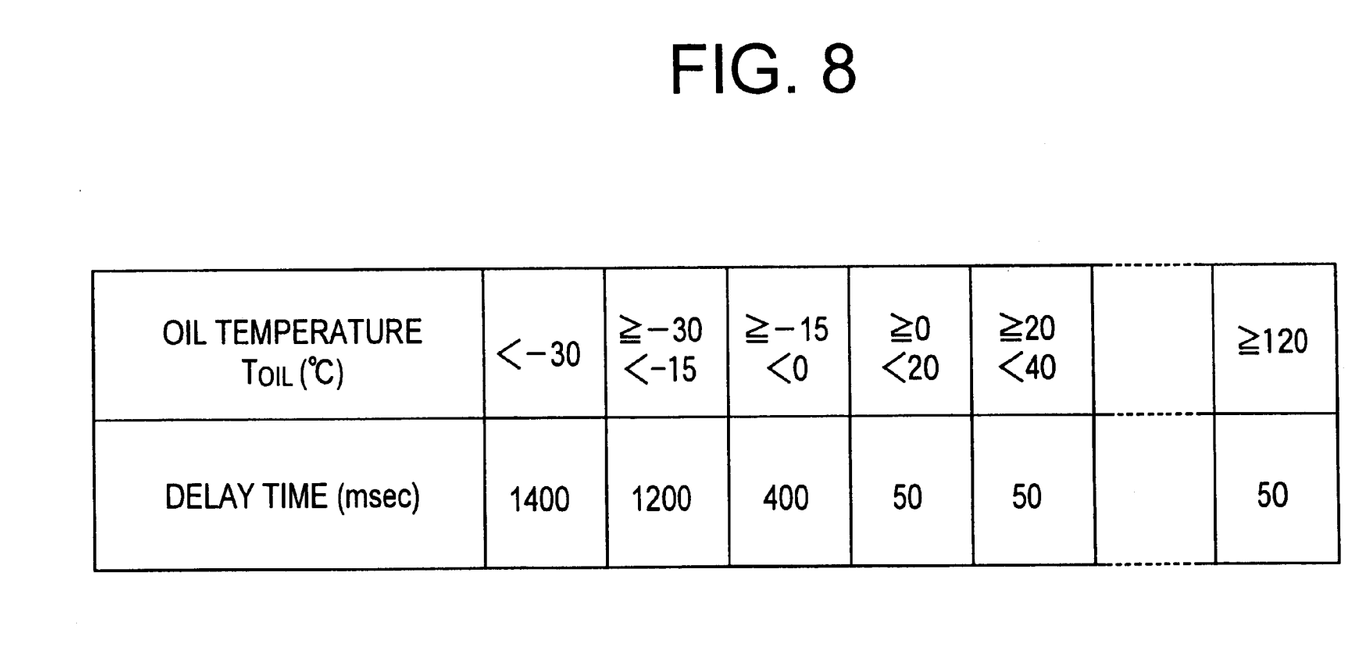
FIG. 8 is a view indicating a relationship used by delay time calculating means to calculate a delay time.

The delay time determining means 124 is arranged to calculate or determine a delay time $t_D$ on the basis of the temperature $T_{OIL}$ of the working fluid in the automatic transmission 14 detected by temperature detecting means in the form of the oil temperature sensor 69, and according to a predetermined relationship between the temperature $T_{OIL}$ and the delay time $t_D$, as shown in FIG. 8 by way of example. The predetermined relationship is represented by a data map stored in the ROM 79, and is obtained by experimentation so that the delay time $t_D$ is a required minimum length of time required for the 2–3 shift valve 100 to be completely switched to the position for establishing the $2^{nd}$-speed position, after the moment at which the automatic transmission 14 is commanded to effect the 3–2 shift-down action. In the specific example of FIG. 8, the delay time $t_D$ is increased in steps with a decrease in the fluid temperature $T_{OIL}$. More specifically described, the data map represents a plurality of values of the delay time $t_D$ which correspond to respective ranges of the fluid temperature $T_{OIL}$, as indicated in FIG. 8. The delay time $t_D$ is determined depending upon the temperature range in which the detected temperature $T_{OIL}$ falls. In the present embodiment, the 2–3 shift valve 100 which is switched according to the hydraulic signal received from the solenoid valve SR is disposed between the linear solenoid valve SL2 operated under the control of the electronic transmission control device 78 (more precisely, the shift commanding means 122), and the C0 control valve 108 which generates the engaging pressure $P_{C0}$ of the clutch C0 according to the hydraulic signal received from the linear solenoid valve SL2, as indicated in FIGS. 6 and 7. In this arrangement, the length of time from the moment at which the automatic transmission 14 is commanded to effect the 3–2 shift-down action, to the moment at which the 2–3 shift valve is switched according to the hydraulic signal from the solenoid-operated valve SR, is elongated as the temperature $T_{OIL}$ of the working fluid is lowered. Accordingly, the engaging pressure $P_{C0}$ of the clutch C0 which should be reduced to effect the 3–2 shift-down action under the control of the transmission control device 78 cannot be reduced immediately after the moment of commanding to effect the 3–2 shift-down action, even if the transmission control device 78 commands to initiate the reduction of the engaging pressure $P_{C0}$ upon commanding to effect the 3–2 shift-down action. In view of this drawback, the application of the drive signal to the linear solenoid valve SL2 is initiated the determined delay time td after the moment of commanding to effect the 3–2 shift-down action.

The delaying means 126 is arranged to delay the moment of initiation of the application of the drive signal to the linear solenoid valve SL2 for controlling or reducing the engaging pressure $P_{C0}$ of the clutch C0, by the delay time $t_D$ as calculated by the delay time determining means 124 on the basis of the temperature $T_{OIL}$ of the working fluid as detected by the oil temperature sensor 69, as described above and as indicated in FIG. 10. To this end, the delaying means 126 commands the shift commanding means 122 to delay the application of the drive signal to the linear solenoid valve SL2, for thereby delaying the application of the hydraulic signal from the linear solenoid valve SL2 to the 2–3 shift valve 100, so that the hydraulic signal is applied to the 2–3 shift valve 100 only after this 2–3 shift valve has been switched to the position for establishing the $2^{nd}$-speed position of the automatic transmission 14. Accordingly, the releasing action of the clutch C0 is delayed by the delay time $t_D$.

Figure 9:
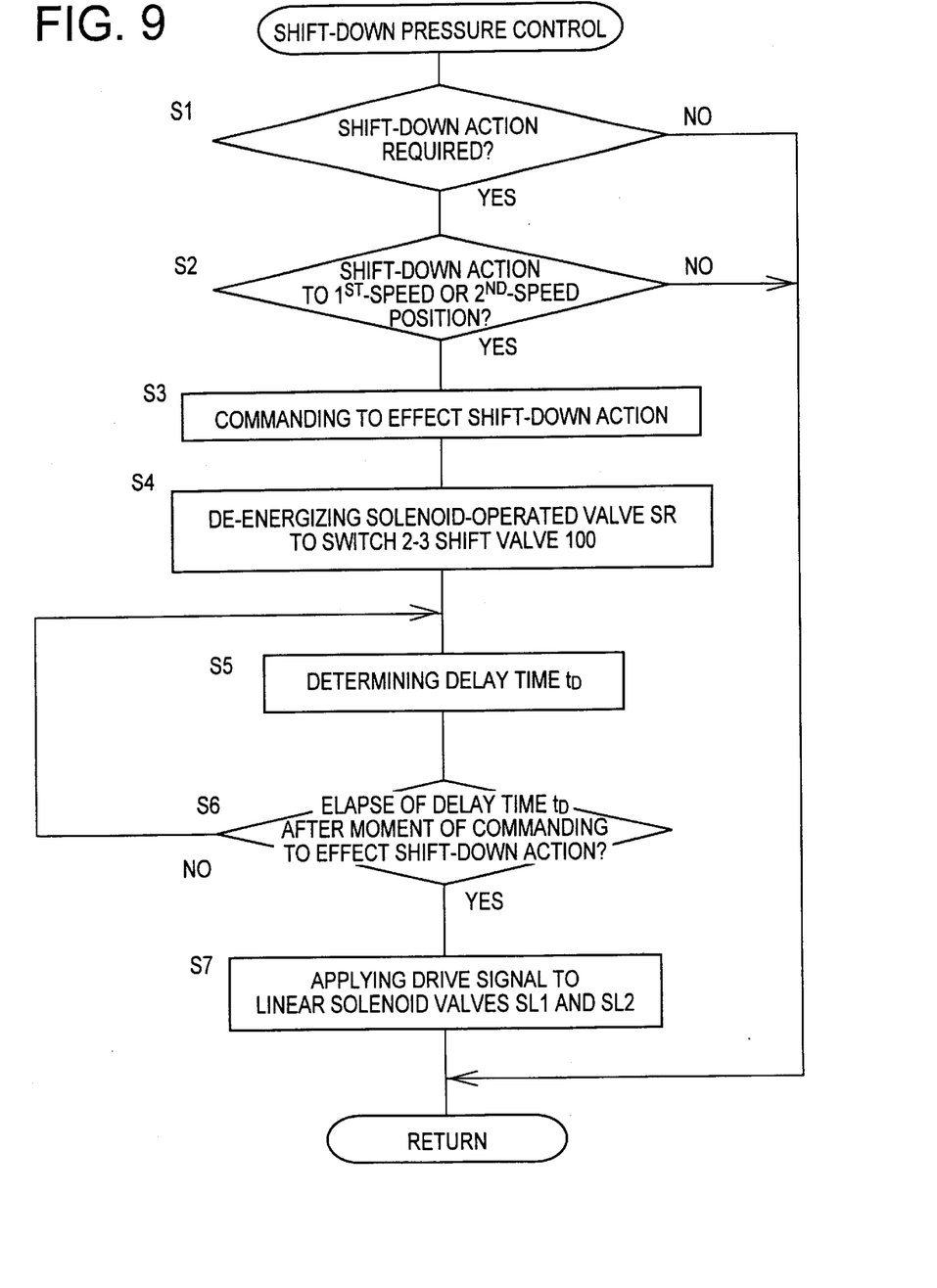
FIG. 9 is a flow chart illustrating a shift-down pressure control routine executed by the electronic transmission control device of FIG. 3.

Referring next to the flow chart of FIG. 9, there will be described a shift-down pressure control routine executed by the electronic transmission control device 78. This control routine is initiated with steps S1 and S2 corresponding to the shifting-action determining means 120. In step S1, the shifting-action determining means 120 determines whether the automatic transmission 14 should be shifted down. This determination is effected on the basis of the vehicle running condition as represented by the detected vehicle speed V and throttle opening angle $\theta_{TH}$ and according to the shift-down boundary lines as indicated in FIG. 5. If an affirmative decision (YES) is obtained in step S1, the control flow goes to step S2 to determine whether the forward drive position to which the automatic transmission 14 should be shifted down is the $1^{st}$-speed position or the $2^{nd}$-speed position. If a negative decision (NO) is obtained in step S1 or S2, one cycle of execution of the control routine of FIG. 9 is terminated. If an affirmative decision (YES) is obtained in step S2 (in steps S1 and S2), the control flow goes to step S3 corresponding to the shift commanding means 122, to start controlling the appropriate valves to effect the required shift-down action to the $1^{st}$-speed or $2^{nd}$-speed position. In the example shown in the time chart of FIG. 10, the 3–2 shift-down action of the automatic transmission 14 is effected by applying drive signals to the solenoid-operated valve SR and the linear solenoid valves SL1 and SL2, to control the B1 control valve 106 and the 2–3 shift valve 100 (C0 control valve 108). In this example, the shift commanding means 122 first de-energizes the solenoid-operated valve SR, to switch the 2–3 shift valve 100 from the position corresponding to the $3^{rd}$-speed position to the position corresponding to the $2^{nd}$-speed position, and then applies to the linear solenoid valves SL1, SL2 the drive signals whose duty ratios are controlled, as described below by reference to FIG. 10.

Step S3 is followed by step S4 also corresponding to the shift commanding means 122, to generate the drive signal to de-energize or turn off the solenoid-operated valve SR, for switching the 2–3 shift valve 100 from the position corresponding to the $3^{rd}$-speed position to the position corresponding to the $2^{nd}$-speed position, at a point of time t1 indicated in FIG. 10. Then, the control flow goes to step S5 corresponding to the delay time determining means 124, to calculate the delay time $t_D$ on the basis of the detected temperature $T_{OIL}$ of the working fluid and according to the predetermined relationship of FIG. 8 stored in the ROM 79. Step S5 is followed by step S6 corresponding to the delaying means 126, to determine whether a time $t_{EL}$ which has elapsed from the moment at which the automatic transmission 14 was commanded to effect the 3–2 shift-down action has increased to the delay time $t_D$. Namely, step S6 is provided to determine whether the delay time $t_D$ has passed after the point of time t1, as indicated in FIG. 10. If an affirmative decision (YES) is obtained in step S6, it means that the 2–3 shift valve 100 has been completed switched to the position corresponding to the $2^{nd}$-speed position. Steps S5 and S6 are repeatedly implemented until the affirmative decision is obtained in step S6. When the affirmative decision is obtained in step S6, at a point of time t2, the control flow goes to step S7 also corresponding to the shift commanding means 122, in which the drive signal is applied to the linear solenoid valve SL2 to release the clutch C0, while at the same time the drive signal is applied to the linear solenoid valve SL1 to engage the brake B1. As a result, the engaging pressure $P_{C0}$ of the clutch C0 is reduced while at the same time the engaging pressure $P_{B1}$ of the brake B1 is increased, as indicated in FIG. 10. Since the linear solenoid valves SL1 and SL2 are normally open valves, the engaging pressures PB1 and $P_{C0}$ of the brake B1 and clutch C0 are zero when the duty ratio is 100%. Accordingly, the duty ratio of the linear solenoid valve SL1 for the brake B1 to be eventually engaged is eventually zeroed, while the duty ratio of the linear solenoid valve SL2 for the clutch C0 to be eventually released is eventually increased to 100%.

In the present embodiment described above, the delaying means 126 (step S6) is arranged to delay the moment of initiation of an operation to reduce the engaging pressure $P_{C0}$ of the frictional coupling device in the form of the clutch C0, by the delay time $t_D$ determined on the basis of the temperature $T_{OIL}$ of the working fluid as detected by the oil temperature sensor 69, so that the reduction of the engaging pressure $P_{C0}$ of the clutch C0 is initiated when the 2–3 shift valve 100 has been completely switched to the position corresponding to the $2^{nd}$-speed position. Accordingly, the reduction of the engaging pressure $P_{C0}$ is initiated at an appropriate point of time determined depending upon the temperature $T_{OIL}$ of the working fluid, making it possible to effectively reduce a shifting shock of the automatic transmission 14, irrespective of a variation in the temperature $T_{OIL}$ of the working fluid, that is, irrespective of a variation in the viscosity of the working fluid.

The illustrated embodiment is further arranged such that the delay time determining means 124 (step S5) determines the delay time $t_D$ such that the delay time $t_D$ is increased with a decrease of the temperature $T_{OIL}$ of the working fluid detected by the oil temperature sensor 69. The delaying means 126 (step S6) delays the moment of initiation of the releasing action of the clutch C0 by the delay time $t_D$ which is increased as the temperature $T_{OIL}$ is lowered, so that the reduction of the engaging pressure $P_{C0}$ of the clutch C0 is initiated when the 2–3 shift valve 100 has been switched to the position corresponding to the $2^{nd}$-speed position. Thus, the delay time determining means 124 permits accurate control of the releasing action of the clutch C0, making it possible to effectively reduce the shifting shock of the automatic transmission 14, irrespective of a variation in the temperature $T_{OIL}$ of the working fluid.

In the example of FIG. 10, the shift control apparatus in the form of the transmission control device 78 is arranged to control the 3–2 shift-down action of the automatic transmission 14 to be effected by a releasing action of a hydraulically operated frictional coupling device in the form of the clutch C0 and an engaging action of another hydraulically operated frictional coupling device in the form of the brake B1, which releasing and engaging actions take place concurrently with each other. The delaying means 126 (step S6) delays the moment of initiation of the releasing action of the clutch C0, by the delay time $t_D$ which is increased with a decrease of the temperature $T_{OIL}$ of the working fluid as detected by the oil temperature sensor 69. Accordingly, the accuracy of control of the releasing action of the clutch C0 is improved. Further, the engaging action of the brake B1 is effected in timed relation with the releasing action of the clutch C0, so that those releasing and engaging actions of the clutch C0 and brake B1 can be controlled with a high degree of accuracy, making it possible to further effectively reduce the shifting shock of the automatic transmission 14, irrespective of the varying temperature $T_{OIL}$ of the working fluid.

While one preferred embodiment of the shift control apparatus of the invention has been described above by reference to the drawings, it is to be understood that the invention may be otherwise embodied.

In the illustrated embodiment, the 2–3 shift valve 100 is disposed between the linear solenoid valve SL2 and the C0 control valve 108. However, the principle of the present invention is equally applicable to a shift control apparatus wherein a switching valve operable according to a selected shifting action of the automatic transmission 14 is disposed between the C0 control valve 108 and the clutch C0.

Figure 11:
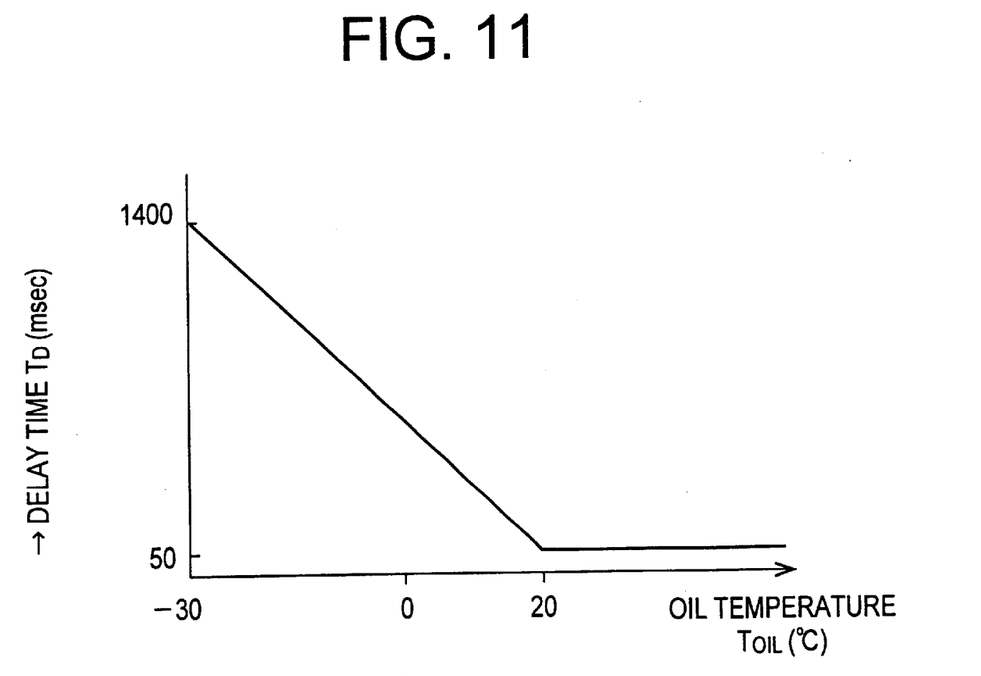
FIG. 11 is a view corresponding to that of FIG. 8, showing a relationship used by the delay time calculating means to calculate the delay time in another embodiment of this invention.

Although the delay time $t_D$ is increased in steps with a decrease in the temperature $T_{OIL}$ of the working fluid, as indicated in FIG. 8, the delay time $t_D$ may be increased linearly or continuously with a decrease of the temperature $T_{OIL}$, according to a predetermined relation as indicated in FIG. 11 by way of example.

The shift control apparatus according to the present invention is applicable to any types of automatic transmission other than the automatic transmission 14 described above with respect to the illustrated embodiments. Although the automatic transmission 14 is adapted to an FF vehicle (front-engine front-drive vehicle) and has the five forward drive positions, the principle of the present invention is applicable to an automatic transmission having less or more than five forward drive positions, and an automatic transmission adapted to an FR vehicle (front-engine rear-drive vehicle).

While the illustrated embodiments are arranged to delay the releasing and engaging actions of the clutch C0 and brake B1 to effect the 3–2 shift-down action, depending upon the temperature $T_{OIL}$ of the working fluid, the principle of the invention is equally applicable to any other shift-down action or a shift-up action of the automatic transmission 14.

Although the illustrated embodiments use the oil temperature 69 as an oil temperature detector to directly detect the temperature $T_{OIL}$ of the working fluid of the automatic transmission 14, the shift control apparatus may use any temperature detector arranged to indirectly detect the temperature $T_{OIL}$.

It is to be understood that the present invention may be embodied with various other changes, modifications and improvements which may occur to those skilled in the art, without departing from the spirit and scope of the present invention defined in the appended claims.

What is claimed is:

1. An apparatus for controlling a vehicle automatic transmission having a hydraulically operated frictional coupling device operable to effect a shifting action of the automatic transmission, a switching valve operable according to a shifting command to effect said shifting action, and a pressure regulating valve operable to control a pressure of a working fluid to be supplied to said frictional coupling device through said switching valve to effect said shifting action, said apparatus comprising: a fluid temperature detector operable to detect a temperature of said working fluid; and delaying means for delaying a moment of initiation of an operation of said pressure regulating valve to control the pressure of the working fluid to be supplied to said frictional coupling device for effecting said shifting action, such that said moment of initiation is delayed depending upon the temperature of the working fluid detected by said fluid temperature detector.

2. An apparatus according to claim 1, wherein said shifting action of the automatic transmission is a shift-down action to increase a ratio of an input speed to an output speed of said automatic transmission.

3. An apparatus according to claim 1, further comprising delay time determining means for determining a delay time by which said moment of initiation of the operation of said pressure regulating valve to control the pressure of the working fluid is delayed, such that said delay time is increased with a decrease in the temperature of the working fluid detected by said fluid temperature detector, and wherein said delaying means delays said moment of initiation of the operation of said pressure regulating valve by said delay time determined by said delay time delaying means.

4. An apparatus according to claim 3, wherein said delay time determining means determines said delay time such that said delay time is continuously increased with the decrease of the temperature of the working fluid detected by said fluid temperature detector.

5. An apparatus according to claim 3, wherein said delay time determining means determines said delay time such that said delay time is increased in steps depending upon the temperature of the working fluid detected by said fluid temperature detector.

6. An apparatus according to claim 3, wherein said shifting action of said automatic transmission is effected by a releasing action of a first frictional coupling device and an engaging action of a second frictional coupling device, which releasing and engaging actions take place substantially concurrently with each other, and said delaying means delays said moment of initiation of the operation of said pressure regulating valve to control the pressure of the working fluid to be supplied to said first frictional coupling device to effect said releasing action thereof for effecting said shifting action of the automatic transmission, said delay time being a length of time from a moment of generation of said shifting command to said moment of initiation of the operation of said pressure regulating valve to initiate said releasing action of said first frictional coupling device.

7. An apparatus according to claim 6, wherein said delaying means delays a moment of initiation of said engaging action of said second frictional coupling device, in timed relation with said releasing action of said second frictional coupling device such that said releasing and engaging actions of said first and second frictional coupling devices take place substantially concurrently with each other.

* * * * *